(12) United States Patent
Luger

(10) Patent No.: US 8,198,980 B1
(45) Date of Patent: Jun. 12, 2012

(54) NUMERIC GEODESIC LOCATOR

(76) Inventor: Dale J. Luger, Centralia, WA (US)

( * ) Notice: Subject to any disclaimer, the term of this patent is extended or adjusted under 35 U.S.C. 154(b) by 151 days.

(21) Appl. No.: 11/859,563

(22) Filed: Sep. 21, 2007

(51) Int. Cl.
- *G05B 23/02* (2006.01)
- *G08B 5/22* (2006.01)
- *H04M 1/00* (2006.01)

(52) U.S. Cl. .................. 340/3.54; 340/7.27; 455/556.1

(58) Field of Classification Search .................. 701/208, 701/431, 412; 340/3.54, 7.27, 995.24; 342/357.1; 345/204; 455/457, 414.1, 556.2

See application file for complete search history.

(56) References Cited

U.S. PATENT DOCUMENTS

| | | | |
|---|---|---|---|
| 5,450,329 A | 9/1995 | Tanner | |
| 6,023,654 A | 2/2000 | Mohlenkamp | |
| 6,865,478 B2 | 3/2005 | Sirola et al. | |
| 2004/0139049 A1 | 7/2004 | Hancock et al. | |
| 2006/0161346 A1 | 7/2006 | Murakami et al. | |
| 2006/0199612 A1* | 9/2006 | Beyer et al. | 455/556.2 |

OTHER PUBLICATIONS

Asian-Countries, 1 page.*
BonnieBrae-elem-Fairfax-VA, 1 page.*
Delhi-City Code, 1 Page.*
USEmbassy_India, 1 Page.*
us_Consualate Mumbai, 1 Page.*
Walmart_Burke VA , 1 Page.*
Google Map, Google Maps for Mobile , 2006, [13], 3 pages.*
Canada-code.pdf; Niagara-Falls,NY.pdf; NY-2.pdf.*
india-code.pdf; indiamap2.pdf,pakistan-code.pdf, russiacode.pdf, islamabad-code.pdf,srinagar.pdf.*
US-consulate-india.pdf; US-embassy-delhi.pdf.*
Google Map, "Google Maps for Mobile" , Jul. 2006.*
Clarke et al., A New World Geographic Reference System, Cartography and Geographic Information Science, vol. 29, No. 4, 2002, pp. 355-362.

\* cited by examiner

*Primary Examiner* — James Trammell
*Assistant Examiner* — Muhammad Shafi
(74) *Attorney, Agent, or Firm* — Chernoff Vilhauer McClung & Stenzel, LLP

(57) ABSTRACT

A geodesic locator system having an input for receiving a user-inputted numeric code in a format limited solely to digits and expressed by a fixed code length. The system associates the received numeric code with a unique geographical area on the Earth's surface and communicates that area to the user.

18 Claims, 2 Drawing Sheets

0450 6 1235 5678

0450 6 1235 5678

NUMERIC GEODESIC LOCATOR

BACKGROUND

1. Field of the Invention

This invention relates generally to geodesic locator ("GL") systems, and more specifically to those systems that employ global mapping in which the earth's surface is divided into small areas identified by a numeric designator.

2. Prior Art

Global Positioning System ("GPS") became popular with back country hikers 15-20 years ago. In order to use these GPS systems, one had to have a hard copy map and translate latitude and longitude coordinates to their location.

Later, GL systems were installed in luxury vehicles. GL navigation systems could get a user from point "A" to point "B;" however, inputting the destination of point "B" in the form of a street address is slow and burdensome.

Most recently, cell phones were equipped with GL systems as well; however, this was a short lived craze because of the difficulty of entering a complete street address into a cell phone, such as "23456 Martin Luther King Blvd, SW, San Francisco, Calif." The task was laborious at best. As a result, requests for cell phone navigation capabilities have virtually vanished.

There is a multitude of existing geo locator mapping systems in the public domain. However, commercial use of geodesic locator systems is severely restricted because of how difficult it is to input desired destinations. GL devices need a user friendly method of inputting virtually any location on earth. Not only will such a concept dramatically improve the mobility and efficiency of society, it can be used to improve the safety of the public as well by easily and quickly guiding emergency vehicles to a destination.

Some of the more commonly known existing systems are longitude and latitude, Universal Transverse Mercator (UTM), Military Grid Reference System (MGRS), decimal degrees, degrees and minutes and seconds, meters, feet, etc. These inconsistent systems of many different formats and units among GL systems present a barrier to general use. Further, these systems employ geographic coordinates of 20 or more characters to represent a location making it difficult at best for general use.

The Empire State Building's location might be described as:
   350 Fifth Avenue,
   New York, N.Y. 10118-0110
or:
   Latitude: 40.7484304750542
   Longitude: −73.9857770519262
or:
(UTM) Universal Transverse Mercator Coordinates
   18N Easting: 585,878.88 Northing: 4,502,849.76
or:
(MGRS) Military Grid Reference System:
   18TWL8587802849
   Section: 18
   Sub Section: T
   Map Section: WL
   Map Point: 8587802849

The USNG (United States National Grid) system was recently introduced that improves on prior systems. It utilizes a single numbering system consisting of 14 alpha-numeric characters. The USNG is predominately used by emergency response teams.

Natural Area Coding System (NAC) is a private domain numbering system that uses 8 to 10 alpha-numeric characters, such as 8T120 PRQ7X. Although this coordinate system is more simple than the others, it still uses alpha-numeric characters and is not cross referenced to specific geographic areas such as Countries, States and Provinces.

Employing alpha characters creates a multitude of problems that are not a factor in numeric (only) systems. Such problems include difficulty in use across different languages and especially languages that do not use characters such as are used in Latin and Anglo/Germanic based languages. Us of alphanumeric symbols also creates confusion in voice recognition of characters due to similarity in pronunciation between alpha characters, such as the difficulty in distinguishing between "B" and "D," "P" and "T," "F" and "S." Also, the screen area on a cell phone is too small to have a touch screen with alpha characters. A multitude of dialects further worsens the recognition problem.

As a result of these difficulties, each country has adopted its own methodology in which to identify specific locations within their country. Thus, GL systems used in vehicles, cell phones and PDA's need to be revised for each country to accommodate their language and geodesic locating technology.

Voice recognition in GL devices only work for dictating a limited set of "commands" such as "Start", "Stop", "Go", "Find" which direct the GL device to perform some corresponding functions. Voice recognition currently does not work with GL devices for inputting addresses for many reasons: voice recognition only works properly when speaking in sentence structures; voice recognition cannot discern the correct spelling of formal names; voice recognition cannot differentiate between homonyms such as "eight" or "ate;" voice recognition cannot differentiate between "Fifth" Street and "$5^{th}$" St.

It is thus an objective to develop a GL system that is not language dependant. It is another objective to use characters common to a cell phone. It is a further objective to facilitate input of a desired destination into any GL device. It is still another objective to provide a GL system capable of locating all street addresses throughout the world. It is yet another objective to provide a GL system capable of locating a specific location even when no street address is assigned. It is yet still another objective to provide a GL system independent of existing Zip Codes and Area Codes. It is also an objective to provide a GL system capable of locating a person, street address or point of interest "within viewable distance," that is, within approximately 20 meters. Although capable of doing so, the system would not be designed to identify specific waypoints as small as 1-2 sq. meters.

SUMMARY

The primary object of the instant geodesic numbering system is to facilitate an improved way to input desired destinations into all types of GL systems such as vehicles, cellular phones and PDA's. The instant numbering system achieves that purpose.

This and other objects are achieved in a GL system that is uniform throughout the earth, not dependent on local systems, translates through all languages and never changes as long as political boundaries do not change because it is derived by dividing land and sea into a natural grid guided by political boundaries and increased areas of influence. Every grid location on earth is identified by a numeric string of no more than 13 digits and in practical use by 8 or 9 digits, which are easily input with a 10-key pad and easily recognized with voice input.

The number of digits required for the numbering system of the present invention is small because the earth's land surface has been subdivided generally into squares 20 meters on a side. For purposes herein and for brevity of description, the numbering system of the present invention will be referred to as the Quick Find, or QF numbering system. Thus, the achievement of the QF numbering system is in making it easy to find a specific property or person by directing the user to within 20 meters (the equivalent of a semi-truck) of his desired location. Placing the user within at least 20 meters is sufficient to locate any destination point (even off road). Once on a given street, the user doesn't continue to look at his geo locator; he typically uses the building numbers to find the address he wants or he may otherwise visually locate the desired location.

The locating 13 digits of the instant QF numbering system utilizes are separated similar to the United States' 11 digit telephone numbering system. For example, a telephone numbering is of the format 1 (XXX) XXX-XXXX The QF Numbering is of the format (0448) 1-XXXX-XXXX. The QF numbering system has been purposefully formatted so as not to be confused with a telephone number.

As with telephones generally, practical use is improved when the system recognizes political boundaries familiar to users, such as countries and states or provinces. Therefore the QF system is country specific as well as state or province specific making it intuitively understandable.

Primarily, the first two QF numbers are assigned countries ranked by their geographic size. Therefore, Russia is designated as "01," Canada is designated "02," China is designated "03" and the United States is the fourth largest country in the world; therefore, it will be described as "04," etc. For expediency, some smaller neighboring countries are combined in these first two digits.

The next two digits are assigned to the states or provinces of each country. Depending upon their geographic size, some states or provinces can be divided into 2 or more QF codes. As an example for the United States; the states are numbered starting from the east-to-west. Maine is designated as "01;" New Hampshire is designated as "02;" Because of their size, larger states are divided into two QF codes. Texas is designated as "37" and "38;" Montana is designated as "39" and "40;" California is designated as "50" and "51;" and Alaska is designated as "52" and "53." This first portion, or area code of the QF numbering system is quite easy to interpret. The area code of (0402) is United States, New Hampshire State.

Each state or province is then subdivided into subsections, which are typically rectangular in shape (boxes), with the subsection being no greater than 40,000 square kilometers. This is the maximum area that can be subdivided into squares twenty meters on a side using only eight digits. For all purposes herein, these squares will hereafter be called destination areas, or destinations. The fifth digit in the QF numbering system refers to a specific subsection, which may have a natural geographical significance or population concentration. Thus, for example the Puget Sound Area of Washington State could be designated as (0448) 1-XXXX-XXXX; or the San Francisco Bay Area of California could be designated (0450) 6-XXXX-XXXX; and the Los Angeles/San Diego area could be designated by (0451) 6-XXXX-XXXX.

For convenience of use, the QF section and subsection digits will remain constant in the users GL device until it is changed. The GL user will only have to change these numbers if he leaves the section (state or province) or subsection. For example, the Empire State Building could be identified with a QF number of (0407) 2-7207-3983, 04=United States; 07=New York State; 2=New York City; 7207-3983=350 Fifth Avenue. The GL user in the New York area would simply input 7207-3983 and their GL device to take them directly to the Empire State Building.

The instant system depends on users knowing or obtaining necessary destination numbers. Those location numbers will be available on an Internet web site. By simply inputting a destination, a user receives his location number. In practice users memorize their location number the same way they do their telephone number or Zip Code. When asked for directions to their home or their office, they simply give their 8-9 digit location number.

Current GL devices currently have limited voice recognition; they only work with commands such as "Start" or "Wake up" and "Stop" and "Location" and "Go To" and "Set" or similar simple commands. These words are not the same over languages, but they presently operate successfully in existing GL systems. The QF numbering system will simply add 10 more words corresponding to ten numeric digits to the existing command library of most GL devices. These ten words will be easily recognized without confusion.

Assuming a GL device that embodies the QF numbering system has been activated either manually or through voice activation, the user simply inputs a destination number, at most 13 numbers and normally eight or nine numbers, either manually on a device key pad or by voice recognition, and then proceed as directed by the GL device.

Cell phones (and PDAs) can also use the QF numbering system. By simply inputting the required 8-9 digit destination code, the cell phone will direct the user to his desired location.

DETAILED DESCRIPTION OF PREFERRED EMBODIMENTS

The numeric based geodesic locator system of the present invention includes a geodesic grid conceptually dividing the earth into sections on land and on sea. Each of the sections on land has section boundaries that follow political boundaries generally. The political boundaries and thus section boundaries at least in part include boundaries of countries, boundaries of states or provinces or other similar divisions of country boundaries.

The system comprises a method of uniquely locating a geodesic area, or areal location on the earth, 20 meters on a side using a numeric code consisting of digits only. Use of the term "digits" is deemed to mean any of the Arabic characters 1 through 9 and 0, exclusively, which ten characters are the only allowable characters in the code. Therefore, for all purposes herein, use of the term "numeric code" shall be deemed to mean a string of such allowable characters and no other characters. The system is configured to receive input of the numeric code from a user that wishes to locate a destination, which he does by entering the code for that destination. The user then is guided to the destination using any of several available global position systems. The code is uniquely formatted with a string of no more than thirteen digits. The first two digits in the string uniquely designate a country (one or more small neighboring countries may be grouped together for this purpose, or otherwise joined with a neighboring country). The next two digits of the string uniquely designate the state or province within the designated country, referred to herein as a section. For this purpose, use of the term 'state' or 'province' is meant to identify a political subdivision within the country. The next digit of the string designates a subsection of the state or province, which may be a significant area of influence, which may be a large population center or natural geographical area. The remaining eight digits of the string uniquely identify a destination area, or destination, typically a square twenty meters on a side.

It is normal that a user will routinely operate within a same sub-section. Therefore, the GL system of the present invention will automatically enter the first five digits of the destination by retaining the same five digits last entered. As a result, the user will only be required to input the remaining eight digits if the destination point is located in the same subsection. The GL user will only have to change the first digits if he leaves the subsection.

Because digits are easily recognized uniquely without confusion by voice, the system further comprises voice recognition to allow hands free operation with the code input of the string of digits being entered by voice.

So the user can easily confirm the accuracy of his input, the system returns the nearest street address to an entered destination, either by displaying the address alphanumerically or by designation on a map, or both, or conceivably by voice.

Figures 1, 2:
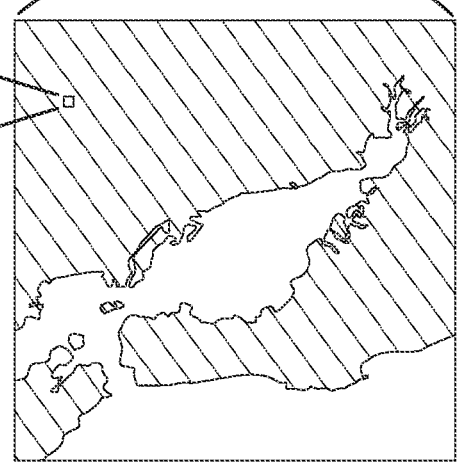
FIG. 1 is a map of a portion of the earth's surface, specifically of a portion of North America, showing successively smaller divisions into a grid of country, state, subsection, and destination squares.
FIG. 2 illustrates the format of the instant numbering system.
Figure 3:
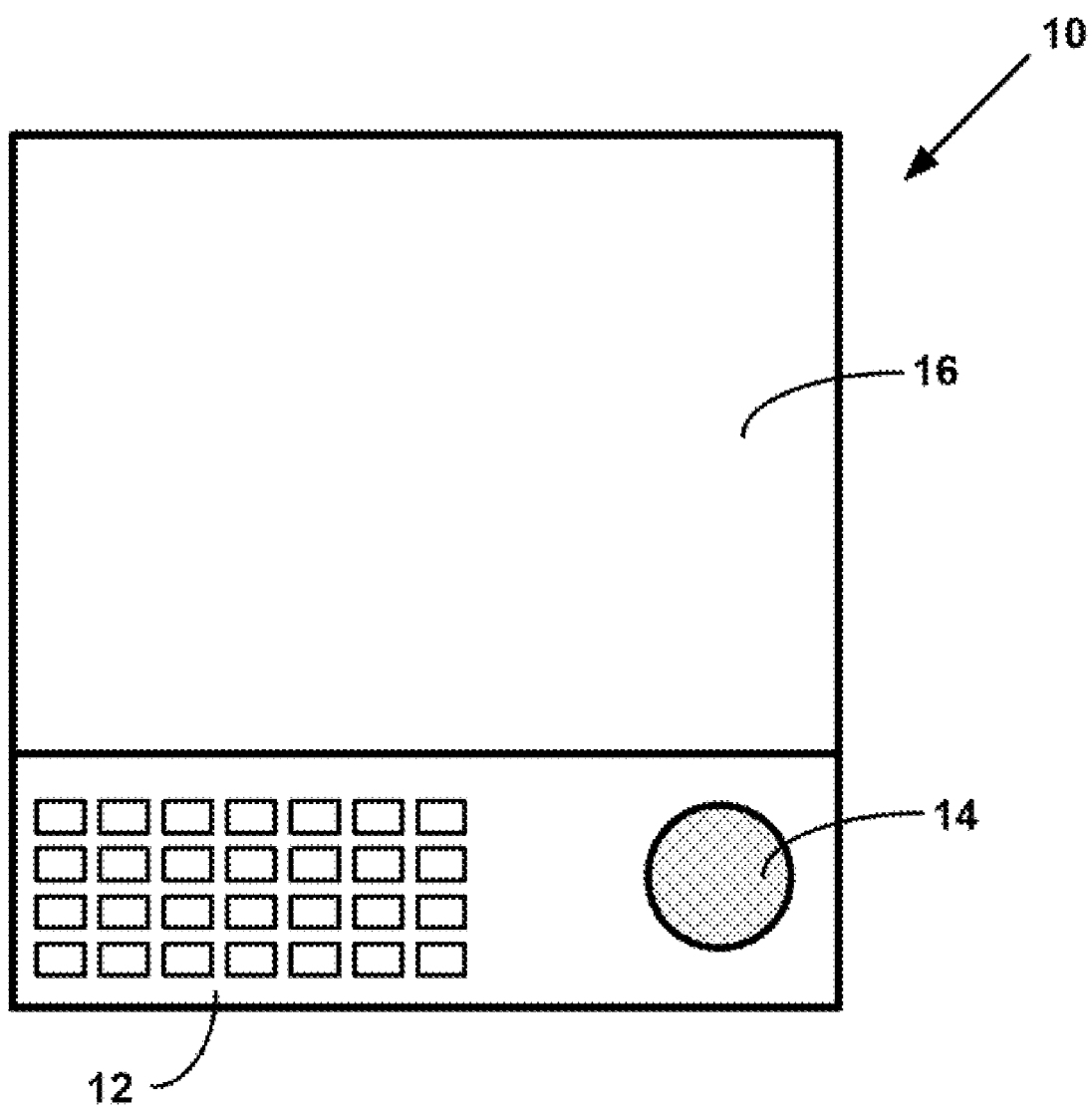
FIG. 3 shows a device capable of receiving a disclosed numeric code from a user and, based on the received code, conveying destination information to the user.

The system, schematically represented in FIG. 3 as a device 10, for example, is intended to be employed in vehicles, in fixed locations, or in a handheld device to permit a user to input a numerical code, as disclosed above, through a keypad 12 and/or audio interface 14 and based on the inputted code, to thereafter receive destination information through a display 16 and/or the audio interface 14. With increasing development of cell phone capability, the system may also be integrated into a cell phone.

Having described the invention, I claim the following:

1. A geodesic locator system comprising:
    (a) an input for receiving from a user a numeric code representing a geographic destination and in a format limited solely to digits, where said format represents said geographic destination with a fixed thirteen digits and where said numeric code is divided into a plurality of non-overlapping sections, where a first section is associated with a respective geographic region circumscribed by geopolitical boundaries of one or more countries, a second said section specifies one of a plurality of locations within said respective geographic region and also circumscribed by geopolitical boundaries, and a third said section uniquely identifies an area within the second said section; and
    (b) an interface for directing said user to said geographic destination using said numeric code, where said interface is capable of directing said user to said geographical area upon contemporaneous entry of a sequence of digits having a length less than thirteen digits.

2. The geodesic locator system of claim 1 where said first section is two digits in length, said second section is two digits in length, and said third section is eight digits in length.

3. The geodesic locator system of claim 2 including a fourth section of said code having a single digit.

4. The geodesic locator system of claim 1 where said input is performed by voice recognition of digits of said code.

5. The geodesic locator system of claim 1 where said length is 9 digits.

6. The geodesic locator system of claim 1 where said length is 8 digits.

7. The geodesic locator system of claim 1 where said geographic area is approximately square with 20 meters on a side.

8. The geodesic locator system of claim 1 where said user is directed to said geographical location by at least one of: (a) a map; (b) a displayed address; or (3) audible instructions.

9. A geodesic locator system comprising:
    (a) a geodesic grid overlaid over at least a portion of the surface of the Earth, said geodesic grid stored at a location accessible to said system, said geodesic grid uniquely associating different geographic areas of a substantially uniform size with respective numeric codes conforming to a format limited solely to digits and expressed by a fixed code length, where at least one digit of said code represents a geographic area circumscribed by geopolitical boundaries;
    (b) an input capable of receiving from a user a sequence of digits cumulatively numbering less than said fixed code length; where
    (c) said system uses the received said sequence of digits to automatically select one of said numeric codes and communicate to said user the geographic area uniquely associated with the automatically selected said numerical code.

10. The geodesic locator system of claim 9 where each said numeric code is a fixed thirteen digits in length.

11. The geodesic locator system of claim 9 where said numeric code has first, second, and third non-overlapping sections, and where said first section is two digits in length, said second section is two digits in length, and said third section is eight digits in length.

12. The geodesic locator system of claim 11 including a fourth section of said code having a single digit.

13. The geodesic locator system of claim 9 where said input is performed by voice recognition of digits of said code.

14. The geodesic locator system of claim 9 where said numeric code is divided into a plurality of non-overlapping sections, where a first section is associated with a respective geographic region circumscribed by geopolitical boundaries or one or more countries, a second said section specifies one of a plurality of locations within said respective geographic region and also circumscribed by geopolitical boundaries, and a third said section uniquely identifies an area within the second said section.

15. The geodesic locator system of claim 14 where said code is 13 digits and said user enters only 8 digits.

16. The geodesic locator system of claim 9 where said code is 13 digits and said user enters only 9 digits.

17. The geodesic locator system of claim 9 where said geographic area is approximately square with 20 meters on a side.

18. The geodesic locator system of claim 9 where said user is directed to said geographical location by at least one of: (a) a map; (b) a displayed address; or (3) audible instructions.

* * * * *

UNITED STATES PATENT AND TRADEMARK OFFICE
CERTIFICATE OF CORRECTION

PATENT NO. : 8,198,980 B1  
APPLICATION NO. : 11/859563  
DATED : June 12, 2012  
INVENTOR(S) : Dale J. Luger It is certified that error appears in the above-identified patent and that said Letters Patent is hereby corrected as shown below:

In the Specifications:

<u>Col. 2, Line 9</u>

Change: "Us" to read: --Use--.

Signed and Sealed this
Thirteenth Day of August, 2013

Teresa Stanek Rea
*Acting Director of the United States Patent and Trademark Office*